US008982482B2

(12) United States Patent
Uemura

(10) Patent No.: US 8,982,482 B2
(45) Date of Patent: Mar. 17, 2015

(54) WIDE-ANGLE OPTICAL SYSTEM, AND IMAGING APPARATUS INCORPORATING THE SAME

(75) Inventor: Ryosuke Uemura, Hachioji (JP)

(73) Assignee: Olympus Corporation, Tokyo (JP)

( * ) Notice: Subject to any disclaimer, the term of this patent is extended or adjusted under 35 U.S.C. 154(b) by 194 days.

(21) Appl. No.: 13/136,255

(22) Filed: Jul. 26, 2011

(65) Prior Publication Data
US 2012/0033311 A1 Feb. 9, 2012

(30) Foreign Application Priority Data

Aug. 5, 2010 (JP) ................. 2010-176113

(51) Int. Cl.
*G02B 13/04* (2006.01)
*G02B 9/34* (2006.01)

(52) U.S. Cl.
CPC ..................... *G02B 13/04* (2013.01)
USPC ......................... 359/753; 359/771

(58) Field of Classification Search
USPC .................. 359/749–753, 761, 770, 781, 783
See application file for complete search history.

(56) References Cited

U.S. PATENT DOCUMENTS

| 5,724,191 A * | 3/1998 | Kouthoofd ............... 359/679 |
| 8,089,708 B2 * | 1/2012 | Yamamoto ............... 359/761 |
| 2010/0201782 A1 * | 8/2010 | Yamada et al. ............ 348/36 |
| 2013/0265653 A1 * | 10/2013 | Kimura .................. 359/716 |

FOREIGN PATENT DOCUMENTS

| JP | 09-166748 | 6/1997 |
| JP | 11-142730 | 5/1999 |
| JP | 11-242155 | 9/1999 |
| JP | 11-249009 | 9/1999 |
| JP | 2000-235145 | 8/2000 |
| JP | 2003-241084 | 8/2003 |
| JP | 2004-348082 | 12/2004 |
| JP | 2006-337691 | 12/2006 |
| JP | 2009-230040 | 10/2009 |
| JP | 2010-061033 | 3/2010 |
| JP | 2010-186011 | 8/2010 |
| JP | 2011-059288 | 3/2011 |

* cited by examiner

*Primary Examiner* — Jordan Schwartz
(74) *Attorney, Agent, or Firm* — Kenyon & Kenyon LLP

(57) ABSTRACT

The wide-angle optical system of the invention comprises, in order from its object side, a first lens group having negative refracting power and a second lens group having positive refracting power. The second lens group comprises, in order from the object side, a first cemented doublet lens, an aperture stop, a second cemented doublet lens and a first double-convex lens. The widest separation among axial air separations except a back focus provides an axial space for receiving the aperture stop. The optical system is divided into the first lens group and the second lens group with the second widest air separation as a boundary. Focusing is implemented by letting the whole optical system out. The optical system satisfies Condition (1).

$$1.4 \leq n_d \leq 1.8 \quad (1)$$

Here $n_d$ is the d-line refractive index of the first double-convex lens.

13 Claims, 13 Drawing Sheets

Example 3

Example 4

Example 1

(a)

(b)

Example5

(a)

(b)

WIDE-ANGLE OPTICAL SYSTEM, AND IMAGING APPARATUS INCORPORATING THE SAME

BACKGROUND OF THE INVENTION

For a wide-angle lens for digital cameras, there is increasing demand toward an optical system having a long back focus, because of the need for providing a space for receiving optical elements such as filters just in front of an electronic imaging plane while making sure a wide angle of view. As such an optical system, there has been a retrofocus type optical system widely adopted, which comprises a front unit of negative refracting power and a rear unit of positive refracting power. Upon incidence on the electronic imaging plane of a light beam passing through the optical system, the quantity of rim light decreases, giving rise to shadings or color shifts, at a time when the incident light beams enter obliquely with respect to the optical axis (the so-called oblique incidence). To solve these problems, there has been an optical system proposed, which keeps hold of the telecentric feature of the incident light beam. Such optical systems have been proposed in JP(A)'s 2010-61033, 2003-241084 and 2000-235145.

A wide-angle lens for recently developed digital cameras is now required to have a low lenses count. With fewer lenses, however, it is difficult to design an optical system that is reduced in terms of aberrations while making sure any desired wide angle, and reduced in terms of field curvature fluctuations upon focusing while keeping the telecentric feature intact.

SUMMARY OF THE INVENTION

The present invention provides a wide-angle optical system, characterized by comprising, in order from an object side thereof, a first lens group having negative refracting power and a second lens group having positive refracting power, wherein the second lens group comprises, in order from the object side, a first cemented doublet lens, an aperture stop, a second cemented doublet lens and a first double-convex lens; the widest separation among axial air separations except a back focus provides an axial space for receiving the aperture stop; the wide-angle optical system is divided into the first lens group and the second lens group with the second widest air separation as a boundary; and focusing is implemented by letting the whole optical system out, with satisfaction of the following Condition (1):

$$1.4 \leq n_d \leq 1.8 \quad (1)$$

where $n_d$ is the d-line refractive index of the first double-convex lens.

In the wide-angle optical system according to this embodiment, the widest separation among the axial air separations except the back focus provides an axial space for receiving the aperture stop. This enables the two cemented doublet lenses to be located such that an axial marginal ray height and an off-axis chief ray height grow high in both cemented doublet lenses. As a result, there is the advantage of the invention obtained: a variety of produced aberrations can be easily corrected.

The wide-angle optical system is divided into the first lens group and the second lens group with the second widest air separation among the axial air separations except the back focus as a boundary. In other words, the separation between the first lens group having negative refracting power and the second lens group having positive refracting power grows so wide that the retrofocus effect becomes strong enough to make sure a large back focus.

By satisfaction of Conditions (1), it is possible to minimize or eliminate adverse influences of ill-balanced aberrations ascribable to ray height fluctuations upon focusing on a close-range object while making good correction of a variety of aberrations.

Exceeding the upper limit to Condition (1) may facilitate correction of astigmatism, etc. at a focusing-on-an-object-at-infinity position, but field curvature fluctuations upon focusing on a close-range object grow too large to offer a performance tradeoff. At less than the lower limit to Condition (1), field curvature fluctuations upon focusing on a close-range object decrease, but it is difficult to correct astigmatism, etc. at the focusing-on-an-object-at-infinity position.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicted in the claims.

DESCRIPTION OF EXEMPLARY EMBODIMENTS

Figure 1:
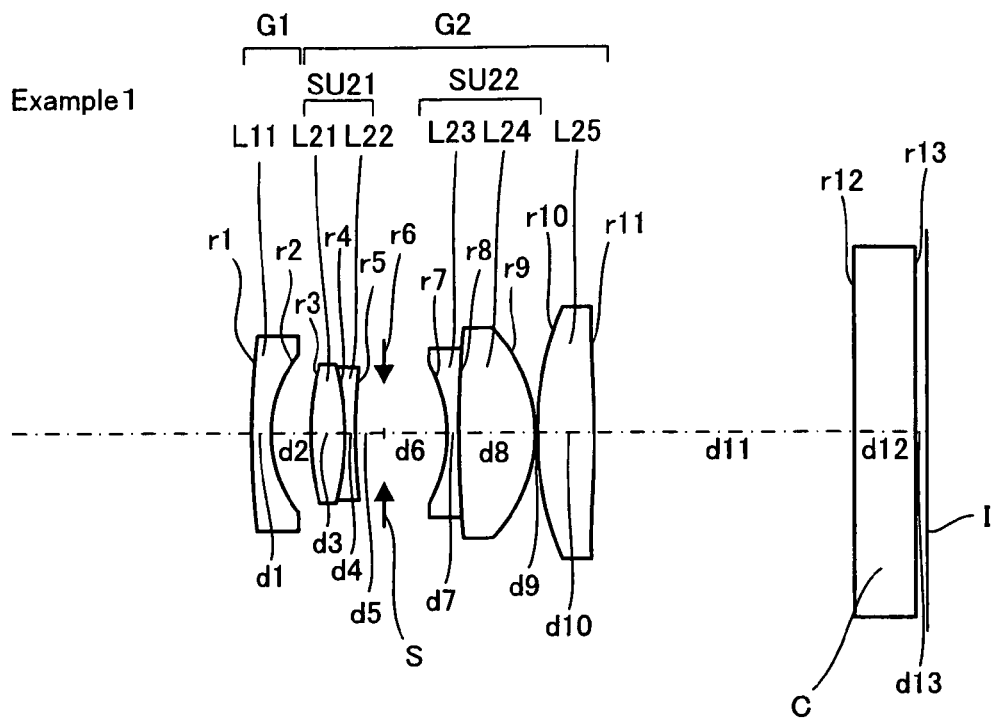
FIG. 1 is a sectional view of the optical system according to Example 1.

The requirements for, and the advantages of, the arrangement of the inventive wide-angle optical system are now explained with reference to several examples. It is here to be noted that the invention is in no sense limited by those example. That is, while the explanation of the examples includes numerous specific details for illustration alone, it is to be understood that those skilled in art could understand that even when various variations and changes are made or added to the specific details, they do not depart from the scope of the invention. Accordingly, the illustrative examples of the invention explained just below will be described without getting rid of, or limiting, the generality of the invention recited in the claims whatsoever.

The examples here provide a wide-angle optical system, characterized by comprising, in order from an object side thereof, a first lens group having negative refracting power and a second lens group having positive refracting power, wherein the second lens group comprises, in order from the object side, a first cemented doublet lens, an aperture stop, a second cemented doublet lens and a first double-convex lens; the widest separation-among axial air separations except a back focus provides an axial space for receiving the aperture stop; the wide-angle optical system is divided into the first lens group and the second lens group with the second widest air separation as a boundary; and focusing is implemented by letting the whole optical system out, with satisfaction of the following Condition (1):

$$1.4 \leq n_d \leq 1.8 \quad (1)$$

where $n_d$ is the d-line refractive index of the first double-convex lens.

The requirements for, and the advantages of, such an arrangement are now explained.

According to the retrofocus type embodiment here wherein the negative lens group is located on the object side and the positive lens group is located on the image side, the image-taking angle of view grows wide and the back focus grows long. Especially because the first lens group has negative refracting power, any desired wide angle of view is ensured enough to make small the angle that forms the off-axis chief ray with the optical axis.

Because the first cemented doublet lens and the second cemented doublet lens are symmetrically located with the aperture stop in the lens group interposed between them, the Petzval's sum throughout the lens system is so reduced or minimized that a variety of produced aberrations such as field curvature, chromatic aberration of magnification, distortion and longitudinal chromatic aberrations can be corrected.

The widest separation among the axial air separations except the back focus provides an axial space for receiving the aperture stop. This enables the two cemented doublet lenses to be located such that the axial marginal ray height and the off-axis chief ray height grow high in both cemented doublet lenses. As a result, there is a specific advantage achievable: it is easy to correct a variety of produced aberrations by making the most of symmetry.

The optical system of the invention is divided into the first lens group and the second lens group with the second widest air separation among the axial air separations except the back focus as a boundary. That is, the wide separation between the first lens group having negative refracting power and the second lens group having positive refracting power makes the retrofocus effect strong enough to make sure any desired large back focus.

With the second cemented doublet lens and the first double-convex lens located on the most image side, an exit pupil is spaced away from an image plane thereby setting up a telecentric optical system. This enables light rays to be incident nearly parallel to the imaging device so that adverse influences of shadings or the like can be reduced or eliminated.

With the performance tradeoff between the time of focusing on an object at infinity and the time of focusing a close-range object in mind, the invention is characterized by satisfaction of Condition (1).

On the presumption that one double-convex lens located on the most image side has the same power in the instant embodiment of the invention, it is preferable to keep its curvature smaller by using a material having a high refractive index, because of its ability to hold back aberrations such as astigmatism.

However, off-axis light rays and the normal direction to the object-side surface of that double-convex lens form a large angle at a position where the light rays grow high, resulting in large ill-balanced aberrations ascribable to fluctuations of height of off-axis light rays passing through that double-convex lens upon focusing a close-range object. To reduce or eliminate the ensuing adverse influences, there are two possible approaches.

The first approach involves lowering the curvature of the object-side surface of that double-convex lens, thereby reducing or eliminating aberration balance fluctuations ascribable to fluctuations of off-axis light ray heights.

The second approach involves lowering the refractive index of that double-convex lens, thereby reducing or eliminating aberration balance fluctuations ascribable to fluctuations of off-axis light ray heights.

However, the first approach is not preferable for correction of spherical aberrations, because there is an increase in the angle that forms axial marginal rays with the normal to the object-side surface of the double-convex lens.

Therefore, the second approach is preferable. More specifically, if the refractive index of one double-convex lens located on the most image side is lowered in such a way as to fall in the range defined by Condition (1), it is then possible to reduce or eliminate the influences of ill-balanced aberrations ascribable to fluctuations of light ray heights upon focusing on a close-range object while making good correction of various aberrations.

Exceeding the upper limit to Condition (1) may help correction of astigmatism or the like at the focusing-on-an-object-at-infinity position, but there are increasing fluctuations of field curvature upon focusing on a close-range object, which renders it difficult to offer the sensible performance tradeoff. At less than the lower limit to Condition (1), there is a reduced or limited fluctuation of field curvature upon focusing on a close-range object, but it is difficult to correct astigmatism or the like at the focusing-on-an-objet-at-infinity position.

For the foregoing reasons, the wide-angle, telecentric optical system having a low lenses count and well corrected for various aberrations is achievable everywhere from the focusing-on-an-object-at-infinity position to the focusing-on-a close-range-object position.

More preferably, the optical system of the invention should satisfy any one of the following requirements or limitations.

Preferably, the first cemented doublet lens consists of a lens whose cementing surface is convex and a lens whose cementing surface is concave, and the second cemented doublet lens consists of a lens whose cementing surface is concave and a lens whose cementing surface is convex.

If the lens whose cementing surface is convex and the lens whose cementing surface is concave are located before the aperture stop in the second lens group and the lens whose cementing surface is concave and the lens whose cementing surface is convex are located after the aperture stop, it is then possible to make the symmetry feature of the whole lens system much better and the Petzval's sum of the whole lens system much smaller; so it is easy to hold back occurrence of aberrations such as chromatic aberrations and field curvature.

For the optical system of the invention, it is preferable that the first lens group is made up of a meniscus lens that is convex on its object side and has negative refracting power; the first cemented doublet lens has positive refracting power and consists of a second double-convex lens and a lens whose cementing surface is concave; and the second cemented doublet lens consists of a double-concave lens and a third double-convex lens.

Such an arrangement as mentioned above enables aberrations occurring at the negative first lens group to be canceled out by the positive cemented lens before the stop in the second lens group; so it makes correction of various aberrations easy with fewer lenses and renders it easy to make sure high optical performance, albeit being of small-format size.

For the optical system of the invention, it is preferable that the second cemented doublet lens has positive refracting power.

By allowing the second cemented doublet lens to have positive refracting power, two sets of cemented lenses: the first cemented doublet lens and the second cemented doublet lens come to have positive refracting power leading to a symmetrical power layout for the aperture stop. That power layout facilitates correction of various aberrations, and enables the optical system to have high optical performance albeit being of a small-format size. In addition, the power layout shares positive power with the first double-convex lens, helping reduce or eliminate the adverse influences of ill-balanced aberrations upon focusing a close-range object.

For the optical system of the invention, it is preferable that the image-side surface of the first double-convex lens is an aspheric surface whose positive refracting power gets weak with a distance from the optical system.

By allowing the image-side surface of the first double-convex lens to be an aspheric surface whose positive refracting power gets weak with a distance from the optical axis, field curvature and barrel distortion likely to occur in reducing the size of the retro-focus type optical system are easily correctable, enabling the optical system to have high performance albeit being of a small-format size.

For the optical system of the invention, it is preferable that the first double-convex lens satisfies the following Condition (2).

$$|dn/dT| \leq 2.0E-4 \quad (2)$$

Here dn/dT is the temperature coefficient [° C.$^{-1}$] of the d-line refractive index of the first double-convex lens. Note here that E stands for power of 10. For instance, [E1-10] stands for a minus 10 power of 10.

The satisfaction of Condition (1) plus the satisfaction of Condition (2) is preferable, because of reduction or minimization of field curvature fluctuations incidental to just only lens position fluctuations during focusing but temperature fluctuations as well.

Exceeding the upper limit to Condition (2) is not preferable because image plane fluctuations incidental to temperature changes grow excessive.

For the optical system of the invention, it is preferable that the first double-convex lens satisfies the following Condition (3).

$$40 \leq v_d \leq 95 \quad (3)$$

Here $v_d$ is the Abbe constant of the first double-convex lens defined by the following formula:

$$(n_d-1)/(n_F-n_C)$$

where $n_d$, $n_F$ and $n_C$ are the d-line, F-line and C-line refractive indices of the first double-convex lens, respectively.

The satisfaction of Condition (3) facilitates correction of chromatic aberrations in general, and chromatic aberration of magnification in particular. Exceeding the upper limit to Condition (3) leaves chromatic aberration of magnification over-corrected, having difficulty making sure peripheral performance in particular. Being short of the lower limit to Condition (3) causes chromatic aberration of magnification to remain under-corrected, rendering it hard to make sure peripheral performance in particular.

For the optical system of the invention, it is preferable that the first double-convex lens satisfies the following Condition (4).

$$0.1 \leq PS \times f \leq 0.2 \quad (4)$$

where f is the focal length of the whole optical system, and PS is the Petzval's sum represented by the following formula:

$$PS = \Sigma ps_j = \Sigma [-c_j(1/n_j - 1/n_{j-1})]$$

where $ps_j$ is defined for each surface,
$c_j$ is the curvature,
$n_j$ is the d-line refractive index of an exit-side medium, and
$n_{j-1}$ is the d-line refractive index of an entrance-side medium.

The satisfaction of Condition (4) facilitates offering a sensible tradeoff between performance upon focusing on an object at infinity and performance upon focusing on a close-range object. The specific feature of the instant arrangement is that while the amount of field curvature fluctuations of the S image plane remains small upon focusing, yet the amount of field curvature fluctuations of the M image plane grows large; so there is a tilt of the M image plane toward the object plane side in association with focusing from the focusing-on-an-object-at-infinity position to the focusing-on-a-close-range-object position. In view of the sensible tradeoff between performance upon focusing on an object at infinity and performance upon focusing on a close-range object, it is thus favorable to correct the M image plane in the focusing-on-infinity state in a positive (image side) direction at a low image height position, and in the opposite (object side) direction at a high image height position.

Exceeding the upper limit to Condition (4) is not preferable for making sure performance in an infinity state, because of too large astigmatism. Being short of the lower limit to Condition (4) is again not preferable for making sure performance, because there is a large negative tilt of the M image plane at the focusing-on-a-close-range object position.

For the optical system of the invention, it is preferable that the first double-convex lens satisfies the following Conditions (5) and (6).

$$0.6 \leq hc12/he12 \leq 1.5 \quad (5)$$

$$0.01 \leq \Delta e/he12 \leq 0.05 \quad (6)$$

Figure 11:
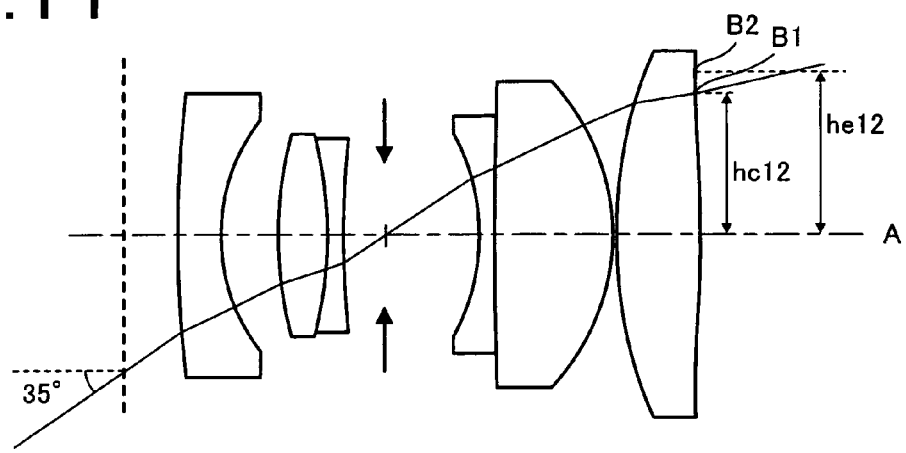
FIG. 11 is illustrative of hc12 and he12.
Figure 12:
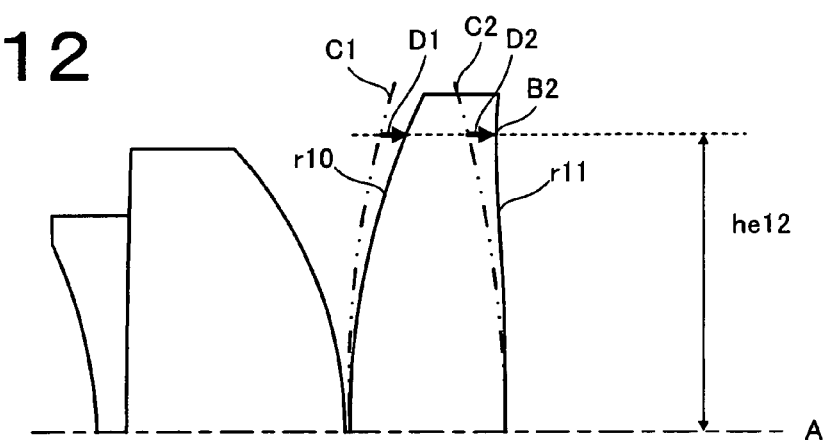
FIG. 12 is illustrative of Δe.

Here, hc12 is the distance from an optical axis A to a point B1 at which an off-axis chief ray having a half angle of view of incidence of 35° upon focusing on an object at infinity passes through an image-side surface r11 of the first double-convex lens, as shown in FIG. 11, he12 is the distance from the optical axis A to a point B2 taking an extreme value at the image-side surface r11 of the first double-convex lens, as shown in FIG. 12, and Δe is the sum at the height he12 of a difference D2 between the image-side surface r11 of the first double-convex lens and a paraxial spherical surface C2 and a difference D1 between and object-side surface r10 of the first double-convex lens and a paraxial spherical surface C1 provided that (difference)= (actual surface shape)−(paraxial spherical shape) where the direction from an object toward the image plane is taken as positive. Note here that a broken line in FIG. 11 stands for a virtual surface vertical to the optical axis.

The satisfaction of Conditions (5) and (6) facilitates correction of field curvature in particular. In view of making sure the performance of the instant arrangement, it is preferable to use an aspheric lens for the last lens. The shape of the aspheric surface is preferably such that, as viewed in lens section inclusive of the optical axis, the image-side surface of the double-convex lens has an extreme value and functions as a convex surface near the paraxial and as a concave surface at the periphery. Near the paraxial, the convex shape has a function of making good correction of spherical aberrations easy, and the peripheral concave shape has a function of flipping up the upper marginal ray and chief ray of off-axis rays, ensuring good correction of field curvature and distortion.

Condition (5) is the one relating to the position of the extreme value. As the upper limit to Condition (5) is exceeded, it causes the influence of the convex shape to prevail as far as the periphery, resulting in the inability to provide sufficient flipping-up of the upper marginal ray and chief ray of off-axis rays and, hence, rendering correction of field curvature and distortion difficult. As the lower limit to Condition (5) is not reached, it causes the influence of the concave shape to grow too strong to provide sufficient flipping-up of the upper marginal ray and chief ray of off-axis rays, rendering correction of spherical aberrations difficult.

Condition (6) determines the sum of differences between the convex surface and the paraxial spherical surfaces. As the upper limit to Condition (6) is exceeded, it causes the influence of the concave shape to prevail as near as the optical axis, rendering correction of spherical aberrations difficult. As the lower limit to Condition (6) is not reached, it causes the influence of the convex shape to grow too strong to provide sufficient flipping-up of the upper marginal ray and chief ray of off-axis rays, rendering correction of field curvature and distortion difficult.

For the optical system of the invention, it is preferable to satisfy the following Condition (7):

$$0.35 \leq (R45+R23)/(R45-R23) \leq 51.0 \quad (7)$$

where $R23$ is the radius of curvature of the cementing surfaces of the cemented doublet lens located on the object side of the aperture stop, and $R45$ is the radius of curvature of the cementing surfaces of the cemented doublet lens located on the image side of the aperture stop.

Condition (7) provides a definition of the shape factors of the cementing surfaces of the cemented doublet lens located on each of the object-side and image-side of the aperture stop. By the satisfaction of Condition (7), the cementing surfaces of the cemented doublet lens located on the object side and the cementing surfaces of the cemented doublet lens located on the image side are substantially symmetrically positioned with the aperture stop interposed between them to place aberration correction in a well-balanced state. As a result, it is easy to reduce or eliminate field curvature and distortion throughout the optical system.

As the upper limit to Condition (7) is exceeded, there is field curvature produced on the object side, which is too large to correct. As the lower limit to Condition (7) is not reached, there is field curvature produced on the image side, which is too large to correct.

For the optical system of the invention, it is preferable to satisfy the following Condition (8):

$$-0.55 \leq (R6r+R6f)/(R6r-R6f) \leq 0.7 \quad (8)$$

where $R6f$ is the radius of curvature of the object-side lens surface of the first double-convex lens, and $R6r$ is the radius of curvature of the image-side lens surface of the first double-convex lens.

Condition (8) provides a definition of the shape factor of the double-convex lens. The satisfaction of Condition (8) facilitates correction of spherical aberrations in particular. As the upper limit to Condition (8) is exceeded, there are spherical aberrations produced on the image side, which are too large to correct. As the lower limit to Condition (8) is not reached, there are spherical aberrations produced on the object side, which are too large to correct.

For the optical system of the invention, it is preferable to satisfy the following Condition (9):

$$0.35 \leq (R3r+R3f)/(R3r-R3f) \leq 0.5 \quad (9)$$

where $R3f$ is the radius of curvature of the object-side lens surface of the lens whose cementing surface is concave in the first cemented doublet lens, and $R3r$ is the radius of curvature of the image-side lens surface of the lens whose cementing surface is concave in the first cemented doublet lens.

Condition (9) provides a definition of the shape factor of the lens whose cementing surface is concave. The satisfaction of Condition (9) facilitates correction of field curvature aberrations in particular. As the upper limit to Condition (9) is exceeded, there is field curvature produced on the object side, which is too large to correct. As the lower limit to Condition (9) is not reached, there is field curvature produced on the image side, which is too large to correct.

For the optical system of the invention, it is preferable to satisfy the following Condition (10):

$$10 \leq (R45r+R45f)/(R45r-R45f) \leq 150 \quad (10)$$

where $R45f$ is the radius of curvature of the object-side lens surface of the second cemented doublet lens, and $R45r$ is the radius of curvature of the image-side lens surface of the second cemented doublet lens.

Condition (10) provides a definition of the shape factor of the cemented doublet lens located on the image side of the aperture stop. The satisfaction of Condition (10) facilitates correction of field curvature in particular. As the upper limit to Condition (10) is exceeded, there is field curvature produced on the image side, which is too large to correct. As the lower limit to Condition (10) is not reached, not only is there field curvature produced on the object side, which is too large to correct, but there is also distortion produced on the minus side, which is too large to correct.

For the optical system of the invention, it is preferable to satisfy the following Conditions (11) and (12):

$$0.85 \leq f2/f \leq 1.2 \quad (11)$$

$$1.35 \leq |f1/f2| \leq 1.5 \quad (12)$$

where f1 is the focal length of the first lens group in the optical system, f2 is the focal length of the second lens group in the optical system, and f is the focal length of the whole optical system.

Condition (11) provides a definition of the refracting power of the second lens group. The satisfaction of Condition (11)

offers a balance between correction of various aberrations and size reduction of the optical system. As the upper limit to Condition (11) is exceeded, various aberrations may be easily corrected because the refracting power of the second lens group becomes weak, yet the whole optical system becomes bulkier because of a longer back focus. As the lower limit to Condition (11) is not reached, it renders correction of various aberrations difficult because the refracting power of the second lens group grows strong.

Condition (12) is the one for a refracting power balance between the first lens group and the second lens group. The satisfaction of Condition (12) offers a balance between correction of various aberrations and making sure any desired back focus. As the upper limit to Condition (12) is exceeded, various aberrations may be easily corrected because the negative refracting power of the first lens group becomes weak relative to the positive refracting power of the second lens group, yet the effect of the retrofocus type becomes slim, rendering it difficult to make sure any desired back focus. As the lower limit to Condition (12) is not reached, it causes the negative refracting power of the first lens group to grow strong relative to the positive refracting power of the second lens group, resulting in the occurrence of aberrations at the first lens group, which are too large to correct with fewer lenses.

For the optical system of the invention, it is preferable to satisfy the following Condition (13):

$$0.7 \leq |HD12/f| \leq 1.8 \tag{13}$$

where f is the focal length of the whole optical system, and HD12 is the separation between the rear principal point of the first lens group and the front principal point of the second lens group in the optical system.

In Condition (13), the separation between the rear principal point of the first lens group and the front principal point of the second lens group is normalized by the focal length of the whole optical system. The satisfaction of Condition (13) offers a balance between making sure any desired back focus and size reduction of the optical system. As the upper limit to Condition (13) is exceeded, it causes the separation between the first lens group and the second lens group to grow wide and the effect of the retrofocus type to grow so strong that it is easy to make sure any desired back focus, yet it sends the whole optical system bulkier. As the lower limit to Condition (13) is not reached, it causes the separation between the first lens group and the second group to become narrow and the effect of the retrofocus type to become too slim to make sure any desired plenty back focus.

For the optical system of the invention, it is preferable to satisfy the following Condition (14):

$$|IH_{35}/EXP| \leq 0.35 \tag{14}$$

where $IH_{35}$ is the distance between the optical axis and a point at which an off-axis chief ray having a half angle of view of incidence of 35° upon focusing on an object at infinity passes through the image plane, and EXP is the axial distance from the image plane upon focusing on an object at infinity to the exit pupil.

Condition (14) provides a definition of the ratio of the maximum image height relative to the axial distance from the image plane to the exit pupil. Any departure from the range of Condition (14) renders it difficult to make sure any desired telecentric optical system because of the inability to space the exit pupil position of the optical system fully away from the image plane. The optical system is also likely to be affected by shadings.

The present invention also provides an imaging apparatus comprising the above wide-angle optical system, a driving means for moving the whole optical system in an optical axis direction, and an imaging device located near an imaging plane of the optical system. For this imaging apparatus, it is preferable that the whole optical system is movable along the optical axis to an imaging device side with respect to a focusing-on-an-object-at-infinity position, and remains stopped on the imaging device side with respect to the focusing-on-an-object-at-infinity position when the imaging apparatus is not in operation.

Focal adjustment of the above wide-angle optical system is implemented in the mode of letting the whole optical system out, wherein the whole optical system is moved in the optical axis direction. Even with the imaging apparatus in operation, the whole optical system length is made as short as possible. And when the imaging apparatus is not in operation, the whole optical system is moved to the imaging plane side with respect to the focusing-on-an-object-at-infinity position, using a focus mechanism that is wholly let out, so that the whole optical system is further curtailed (the so-called received-in-a-lens-mount state).

In incorporating the foregoing wide-angle optical system in the imaging apparatus, it is preferable that with the imaging apparatus not in operation, there is a space vacated beforehand between the lens located on the most image side of the optical system and the imaging device such that the optical system is movable along the optical axis to the imaging device side with respect to the focusing-on-an-object-at-infinity state so that a control zone on the imaging device side can be ensured even with the whole lens barrel received in the lens mount.

As the foregoing optical system is designed such that the space on the imaging device side is reduced as much as possible, it may help reduce the size of the whole optical system. However, the optical system is too greatly affected by shadings, because the exit pupil lies too close to the image plane. In the imaging apparatus using the above optical system, therefore, a space wide enough for the telecentric feature is vacated by spacing the exit pupil fully away from the image plane when the imaging apparatus is in operation, and a space wide enough to prevent interference with low-pass filters or the like before the imaging device even when the whole optical system is moved to the image side is vacated between the lens located on the most image side and the image device while the imaging apparatus is not in operation, thereby offering a sensible tradeoff between size reductions of the imaging apparatus not in operation and optical performance of the imaging apparatus in operation.

More preferably, the respective conditions should be narrowed down.

$$1.44 \leq n_d \leq 1.75 \tag{1}'$$

$$|dn/dT| \leq 1.5E-4 \tag{2}'$$

$$45 \leq v_d \leq 85 \tag{3}'$$

$$0.11 \leq PS \times f \leq 0.19 \tag{4}'$$

$$0.7 \leq hc12/he12 \leq 1.3 \tag{5}'$$

$$0.01 \leq \Delta e/he12 \leq 0.04 \tag{6}'$$

$$0.3 \leq (R6r+R6f)/(R6r-R6f) \leq 0.7 \tag{8}'$$

$$0.95 \leq f2/f \leq 1.1 \tag{11}'$$

$$0.7 \leq HD12/f \leq 1.0 \tag{13}'$$

$$|IH_{35}/EXP| \leq 0.3 \tag{14}'$$

It is here noted that only the lower limit value or the upper limit value of each condition may be redefined as the new one.

The optical systems of Examples 1 to 5 according to the invention are now explained.

FIG. 1 is a sectional view of the optical system of Example 1.

As shown in FIG. 1, the wide-angle optical system of Example 1 is built up of, in order from the object side, first lens group G1 having negative refracting power and a second lens group G2 having positive refracting power.

The first lens group G1 is made up of a negative meniscus lens L11 convex on its object side.

The second lens group G2 is made up of, in order from the object side, a first cemented doublet lens SU21 of a double-convex positive lens L21 and a double-concave negative lens L22, an aperture stop S, a second cemented doublet lens SU22 of a double-concave negative lens L23 and a double-convex positive lens L24, and one double-convex positive lens L25.

Two aspheric surfaces are used, each for each surface of one double-convex positive lens L25 in the second lens group G2.

Figure 2:
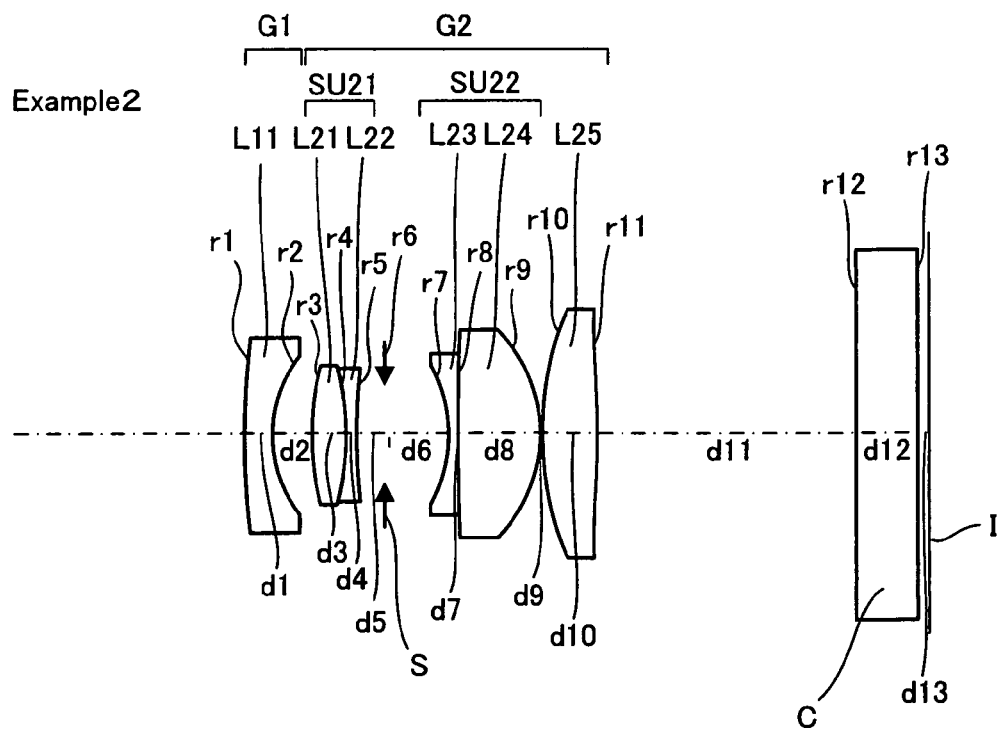
FIG. 2 is a sectional view of the optical system according to Example 2.

FIG. 2 is a sectional view of the optical system of Example 2.

As shown in FIG. 2, the wide-angle optical system of Example 2 is built up of, in order from the object side, a first lens group G1 having negative refracting power and a second lens group G2 having positive refracting power.

The first lens group G1 is made up of a negative meniscus lens L11 convex on its object side.

The second lens group G2 is made up of, in order from the object side, a first cemented doublet lens SU21 of a double-convex positive lens L21 and a double-concave negative lens L22, an aperture stop S, a second cemented doublet lens SU22 of a double-concave negative lens L23 and a double-convex positive lens L24, and one double-convex positive lens L25.

Two aspheric surfaces are used, each for each surface of one double-convex positive lens L25 in the second lens group G2.

Figure 3:
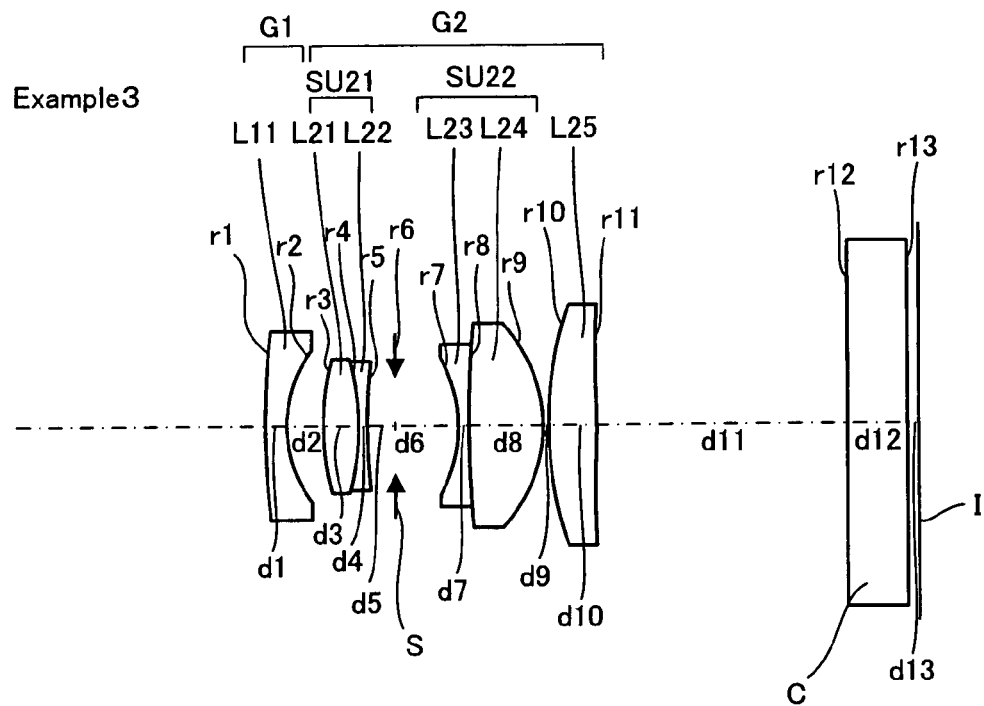
FIG. 3 is a sectional view of the optical system according to Example 3.

FIG. 3 is a sectional view of the optical system of Example 3.

As shown in FIG. 3, the wide-angle optical system of Example 3 is built up of, in order from the object side, a first lens group G1 having negative refracting power and a second lens group G2 having negative refracting power.

The first lens group G1 is made up of a negative meniscus lens L11 convex on its object side.

The second lens group G2 is made up of, in order from the object side, a first cemented doublet lens SU21 of a double-convex positive lens L21 and a double-concave negative lens L22, an aperture stop S, a second cemented doublet lens SU22 of a double-concave negative lens L23 and a double-convex positive lens L24, and one double-convex positive lens L25.

Two aspheric surfaces are used, each for each surface of one double-convex positive lens L25 in the second lens group G2.

Figure 4:
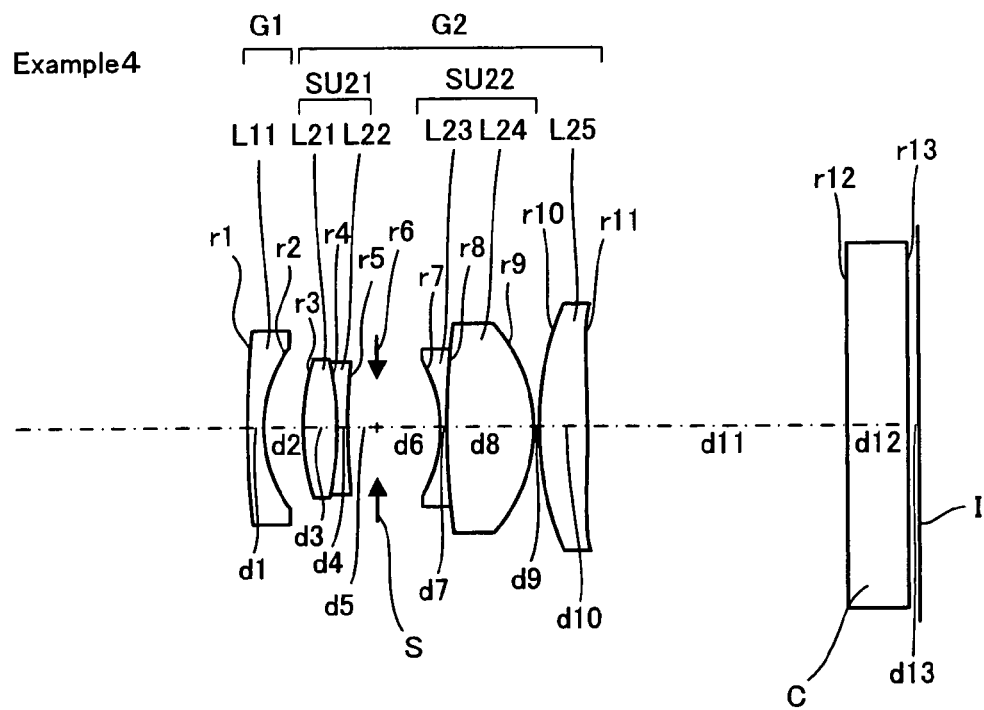
FIG. 4 is a sectional view of the optical system according to Example 4.

FIG. 4 is a sectional view of the optical system of Example 4.

As shown in FIG. 4, the wide-angle optical system of Example 4 is built up of, in order from the object side, a first lens group G1 having negative refracting power and a second lens group G2 having negative refracting power.

The first lens group G1 is made up of a negative meniscus lens L11 convex on its object side.

The second lens group G2 is made up of, in order from the object side, a first cemented doublet lens SU21 of a double-convex positive lens L21 and a double-concave negative lens L22, an aperture stop S, a second cemented doublet lens SU22 of a double-concave negative lens L23 and a double-convex positive lens L24, and one double-convex positive lens L25.

Two aspheric surfaces are used, each for each surface of one double-convex positive lens L25 in the second lens group G2.

Figure 5:
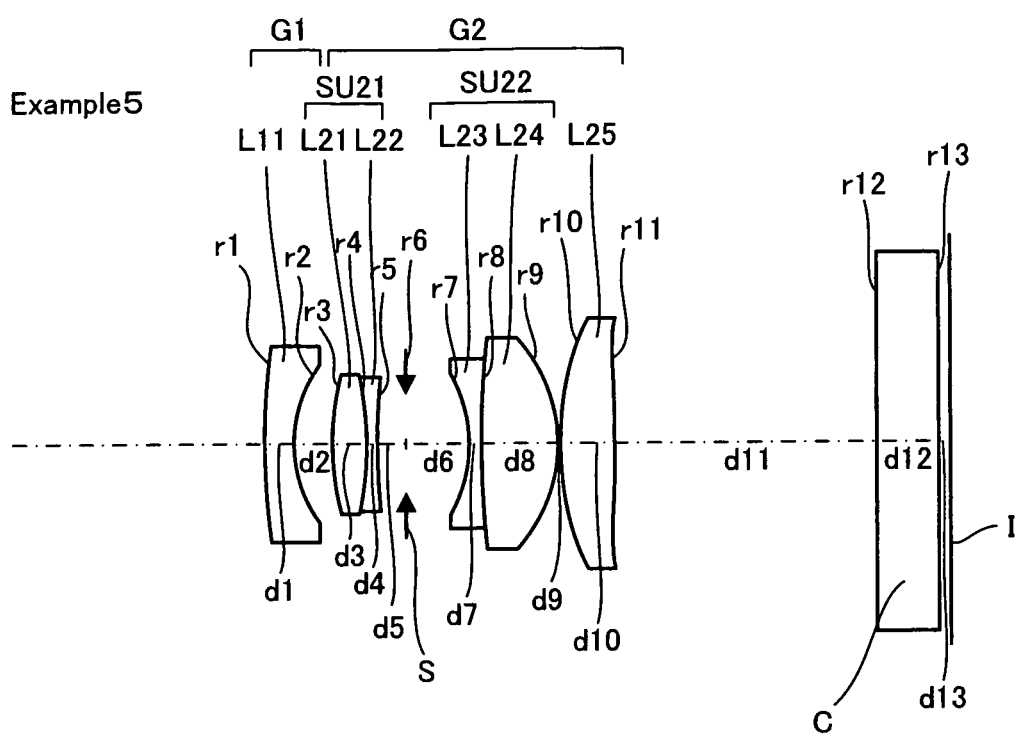
FIG. 5 is a sectional view of the optical system according to Example 5.
Figure 6:
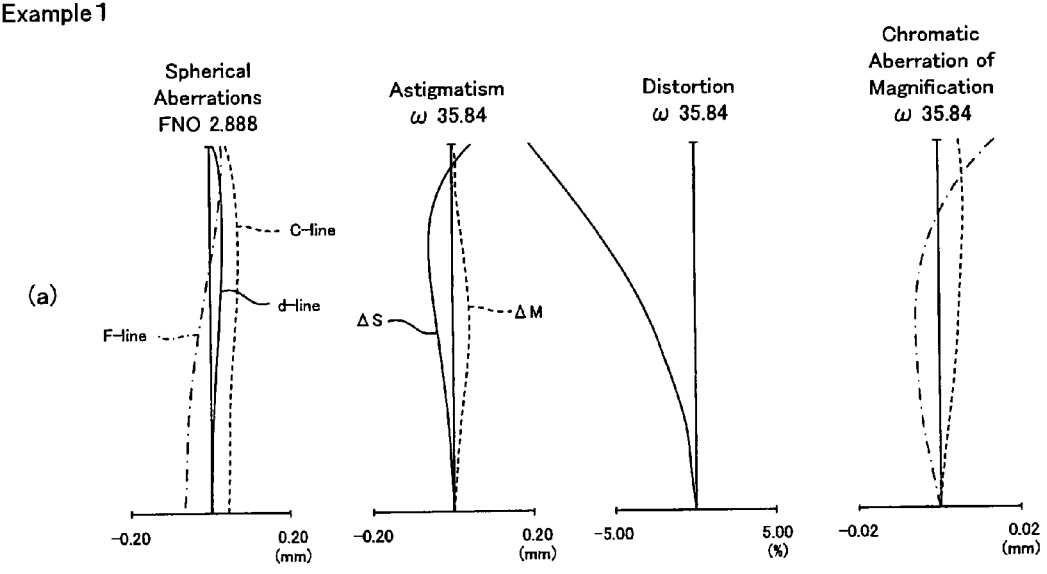
FIG. 6 is an aberration diagram for the optical system according to Example 1.
Figure 6:
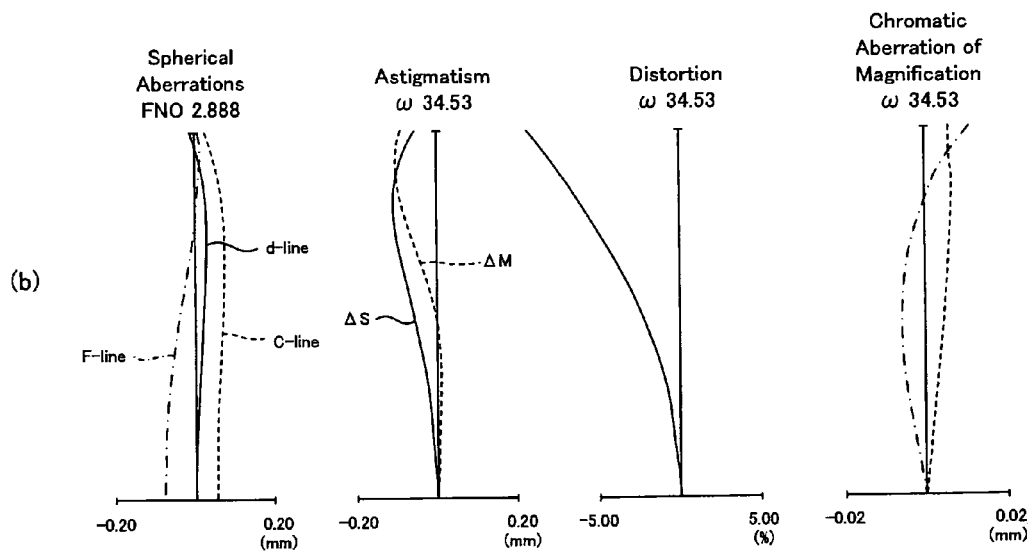
Figure 7:
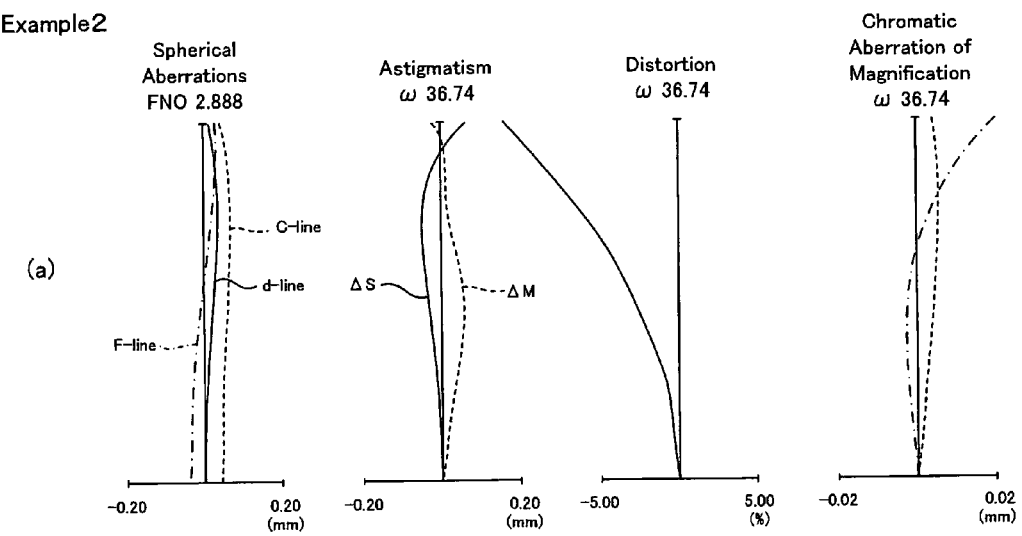
FIG. 7 is an aberration diagram for the optical system according to Example 2.
Figure 7:
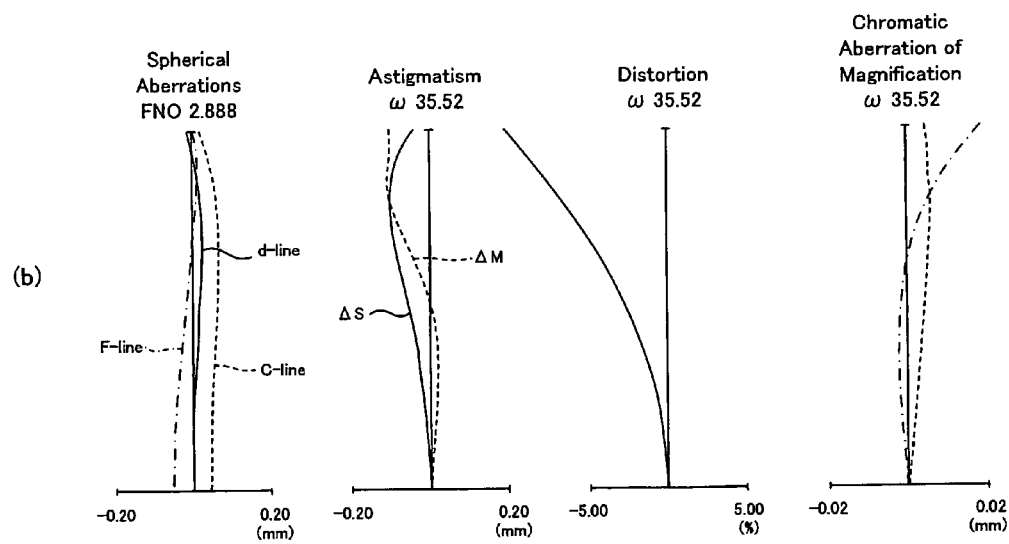
Figure 8:
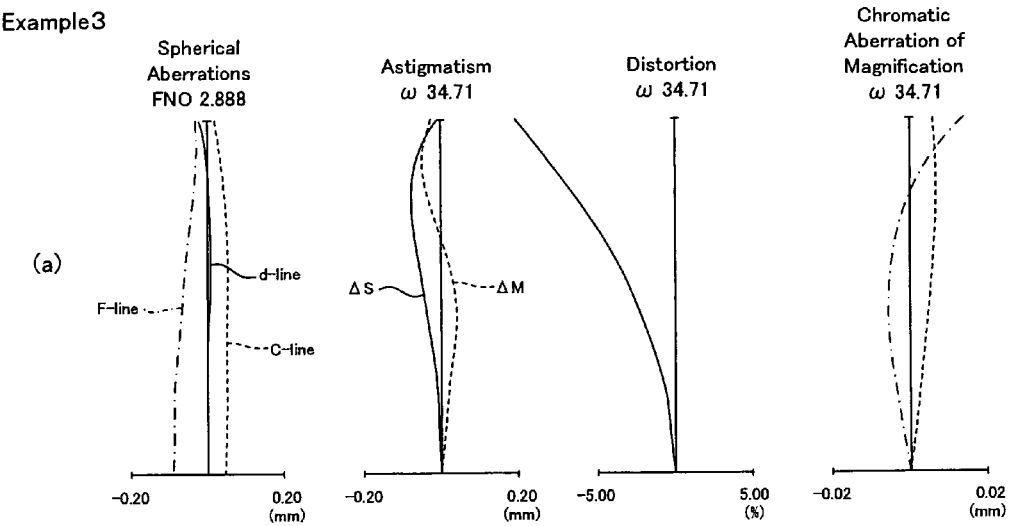
FIG. 8 is an aberration diagram for the optical system according to Example 3.
Figure 8:
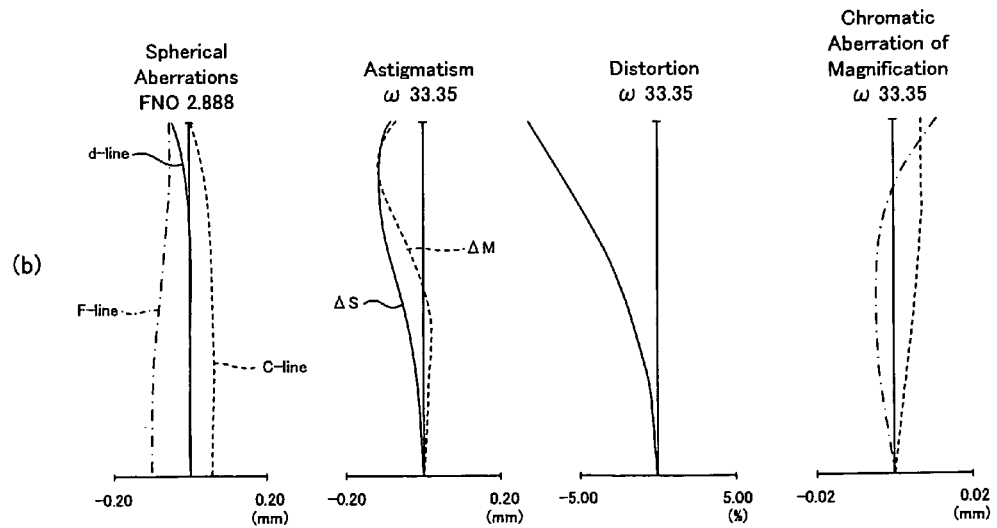
Figure 9:
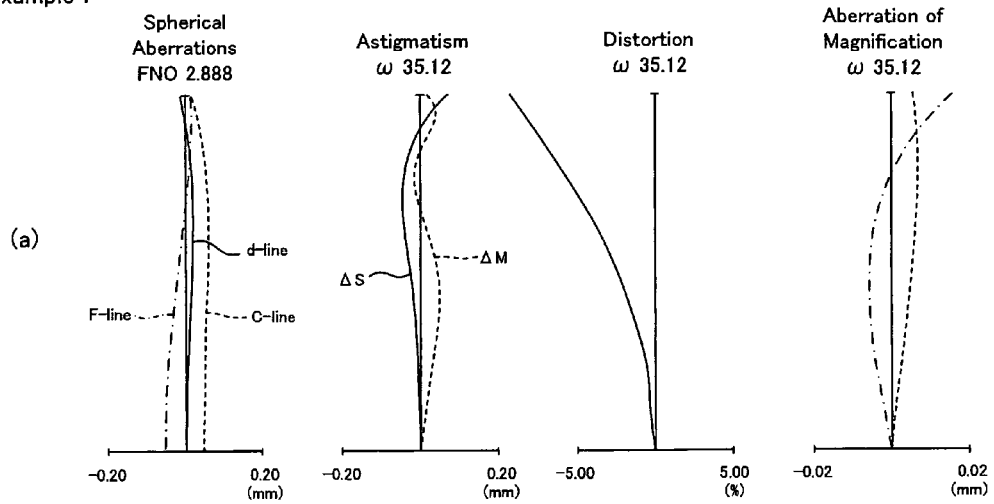
FIG. 9 is an aberration diagram for the optical system according to Example 4.
Figure 9:
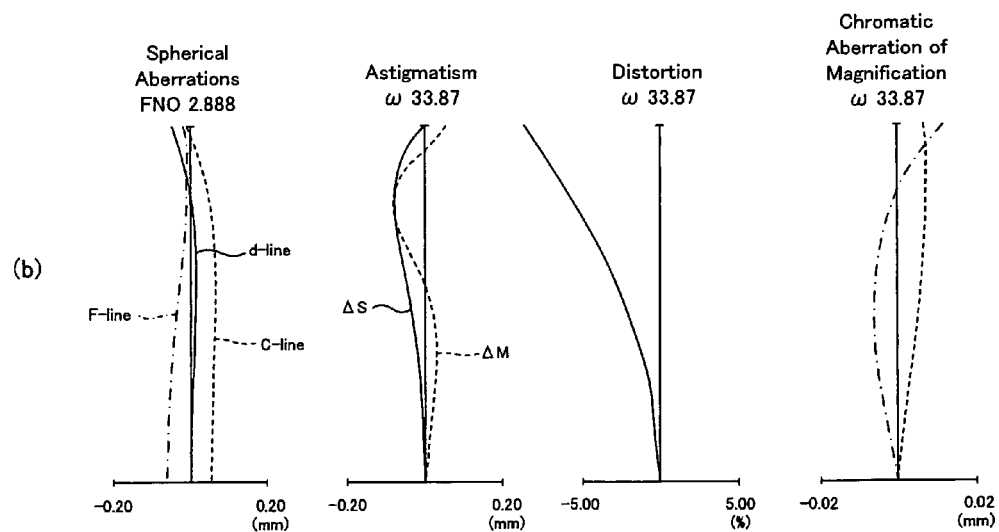
Figure 10:
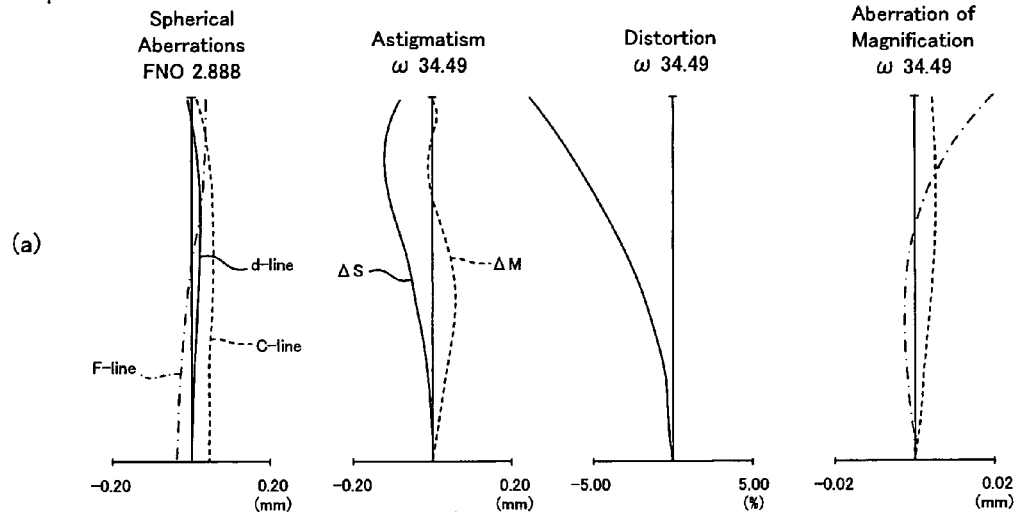
FIG. 10 is an aberration diagram for the optical system according to Example 5.
Figure 10:
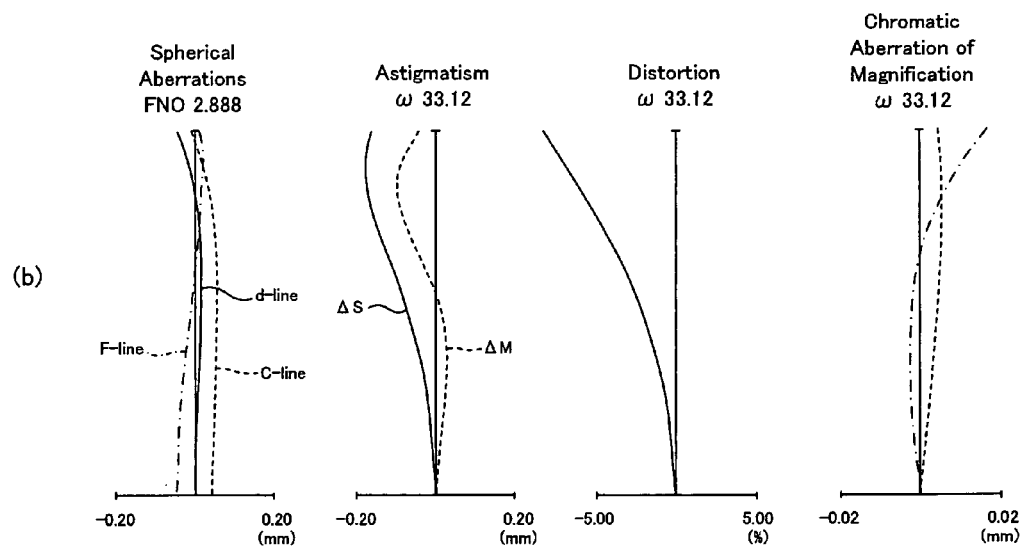

FIG. 5 is a sectional view of the optical system of Example 5.

As shown in FIG. 5, the wide-angle optical system of Example 5 is built up of, in order from the object side, a first lens group G1 having negative refracting power and a second lens group G2 having negative refracting power.

The first lens group G1 is made up of a negative meniscus lens L11 convex on its object side.

The second lens group G2 is made up of, in order from the object side, a first cemented doublet lens SU21 of a double-convex positive lens L21 and a double-concave negative lens L22, an aperture stop S, a second cemented doublet lens SU22 of a double-concave negative lens L23 and a double-convex positive lens L24, and one double-convex positive lens L25.

Two aspheric surfaces are used, each for each surface of one double-convex positive lens L25 in the second lens group G2.

Set out below are numeral data about Examples 1 to 5, wherein r is the radius of curvature of a lens surface, d is the lens thickness or air separation, nd and vd are the d-line refractive index and Abbe constant, respectively, f is the focal length of the whole optical system, Fno is the F-number, and ω is the half angle of view (°)

In the specifications tables in the explanation of the examples, the surface followed by (aspheric) is a surface of aspheric shape that is represented by the following formula (a):

$$X(H)=(H^2/r)/\{1+[1-(1+K)\cdot(H^2/r^2)]^{1/2}\}A4H^4+A6H^6+A8H^8+A10H^{10} \tag{a}$$

where H is the height vertical to the optical axis, X(H) is the amount of displacement at the height H with the vertex as the origin, r is the paraxial radius of curvature, K is the conic coefficient, and A4, A6, A8 and A10 are the fourth-, sixth-, eighth- and tenth-order aspheric coefficients, respectively.

Numeral Example 1

Unit mm

Surface Data

| Surface Number | r | d | nd | vd |
|---|---|---|---|---|
| 1 | 57.756 | 1.35 | 1.48749 | 70.23 |
| 2 | 8.748 | 2.61 | | |
| 3 | 18.405 | 2.28 | 1.83400 | 37.16 |
| 4 | −18.683 | 0.69 | 1.56732 | 42.82 |
| 5 | 47.929 | 1.84 | | |
| 6 (Stop) | ∞ | 4.17 | | |
| 7 | −9.799 | 0.80 | 1.75211 | 25.05 |
| 8 | 91.681 | 5.01 | 1.72916 | 54.68 |
| 9 | −10.316 | 0.13 | | |
| 10 (Aspheric Surface) | 22.803 | 3.80 | 1.53071 | 55.67 |
| 11 (Aspheric Surface) | −63.928 | 17.15 | | |
| 12 | ∞ | 4.05 | 1.51633 | 64.14 |
| 13 | ∞ | 0.75 | | |
| Image Plane | ∞ | | | |

Aspheric Data
10th Surface

K = −0.016, A4 = −4.37943E−08, A6 = 3.51554E−08,
A8 = 2.38957E−09

-continued

| Unit mm | | | | |
|---|---|---|---|---|
| 11th Surface | | | | |

K = −27.269, A4 = 4.45183E−05, A6 = −2.16109E−08, A8 = 3.47481E−09

| Data Set | |
|---|---|
| f | 17.23 |
| Fno | 2.89 |
| Angle of View (2 ω) | 71.67° |
| Image Height | 11.15 |
| B F (in air) | 20.56 |
| Full Lens Length | 43.25 |

Numeral Example 2

| Unit mm | | | | |
|---|---|---|---|---|
| Surface Data | | | | |
| Surface Number | r | d | nd | vd |
| 1 | 54.391 | 1.94 | 1.48749 | 70.23 |
| 2 | 8.431 | 2.63 | | |
| 3 | 19.417 | 2.28 | 1.83400 | 37.16 |
| 4 | −17.548 | 0.69 | 1.56732 | 42.82 |
| 5 | 48.363 | 1.84 | | |
| 6 (Stop) | ∞ | 4.17 | | |
| 7 | −10.439 | 0.74 | 1.75211 | 25.05 |
| 8 | 217.908 | 5.42 | 1.72916 | 54.68 |
| 9 | −10.592 | 0.09 | | |
| 10 (Aspheric Surface) | 21.809 | 3.87 | 1.49700 | 81.54 |
| 11 (Aspheric Surface) | −58.428 | 17.15 | | |
| 12 | ∞ | 4.05 | 1.51633 | 64.14 |
| 13 | ∞ | 0.75 | | |
| Image Plane | ∞ | | | |
| Aspheric Data | | | | |
| 10th Surface | | | | |

K = −0.006, A4 = 6.36012E−08, A6 = 5.09958E−10, A8 = 3.71078E−09

11th Surface

K = −26.933, A4 = 4.41271E−05, A6 = −1.00023E−07, A8 = 5.51439E−09

| Data Set | |
|---|---|
| f | 16.81 |
| Fno | 2.89 |
| Angle of View (2 ω) | 73.48° |
| Image Height | 11.15 |
| B F (in air) | 20.55 |
| Full Lens Length | 44.23 |

Numeral Example 3

| Unit mm | | | | |
|---|---|---|---|---|
| Surface Data | | | | |
| Surface Number | r | d | nd | vd |
| 1 | 51.399 | 1.63 | 1.48749 | 70.23 |
| 2 | 9.039 | 2.48 | | |
| 3 | 18.264 | 2.28 | 1.83400 | 37.16 |
| 4 | −20.687 | 0.69 | 1.56732 | 42.82 |
| 5 | 50.027 | 1.84 | | |
| 6 (Stop) | ∞ | 4.17 | | |
| 7 | −10.243 | 0.83 | 1.75211 | 25.05 |
| 8 | 86.785 | 5.03 | 1.72916 | 54.68 |
| 9 | −10.686 | 0.31 | | |
| 10 (Aspheric Surface) | 28.461 | 3.35 | 1.69350 | 53.21 |
| 11 (Aspheric Surface) | −104.281 | 17.15 | | |

-continued

| Unit mm | | | | |
|---|---|---|---|---|
| 12 | ∞ | 4.05 | 1.51633 | 64.14 |
| 13 | ∞ | 0.75 | | |
| Image Plane | ∞ | | | |
| Aspheric Data | | | | |
| 10th Surface | | | | |

K = 1.326, A4 = 1.72221E−05, A6 = 5.40432E−11, A8 = 2.82500E−09

11th Surface

K = −124.089, A4 = 4.96066E−05, A6 = 8.69061E−10, A8 = 4.18831−09

| Data Set | |
|---|---|
| f | 17.70 |
| Fno | 2.89 |
| Angle of View (2 ω) | 69.42° |
| Image Height | 11.15 |
| B F (in air) | 20.55 |
| Full Lens Length | 43.18 |

Numeral Example 4

| Unit mm | | | | |
|---|---|---|---|---|
| Surface Data | | | | |
| Surface Number | r | d | nd | vd |
| 1 | 57.521 | 1.16 | 1.48749 | 70.23 |
| 2 | 9.478 | 2.57 | | |
| 3 | 18.234 | 2.28 | 1.83400 | 37.16 |
| 4 | −19.996 | 0.69 | 1.56732 | 42.82 |
| 5 | 50.747 | 1.84 | | |
| 6 (Stop) | ∞ | 4.17 | | |
| 7 | −9.562 | 0.45 | 1.75211 | 25.05 |
| 8 | 62.350 | 5.81 | 1.72916 | 54.68 |
| 9 | −10.710 | 0.31 | | |
| 10 (Aspheric Surface) | 26.835 | 3.20 | 1.69350 | 53.21 |
| 11 (Aspheric Surface) | −103.176 | 17.15 | | |
| 12 | ∞ | 4.05 | 1.51633 | 64.14 |
| 13 | ∞ | 0.75 | | |
| Image Plane | ∞ | | | |
| Aspheric Data | | | | |
| 10th Surface | | | | |

K = 1.426, A4 = 1.68480E−05, A6 = 1.47553E−07, A8 = 4.73417E−09

11th Surface

K = −21.829, A4 = 6.47465E−05, A6 = 2.8097E−09, A8 = 8.17464−09

| Data Set | |
|---|---|
| f | 17.48 |
| Fno | 2.89 |
| Angle of View (2 ω) | 70.23° |
| Image Height | 11.15 |
| B F (in air) | 20.59 |
| Full Lens Length | 43.08 |

Numeral Example 5

| Unit mm | | | | |
|---|---|---|---|---|
| Surface Data | | | | |
| Surface Number | r | d | nd | vd |
| 1 | 50.309 | 1.90 | 1.48749 | 70.23 |
| 2 | 9.266 | 2.50 | | |

-continued

| Unit mm | | | | |
|---|---|---|---|---|
| 3 | 18.485 | 2.28 | 1.83400 | 37.16 |
| 4 | −21.848 | 0.69 | 1.56732 | 42.82 |
| 5 | 50.684 | 1.84 | | |
| 6 (Stop) | ∞ | 4.17 | | |
| 7 | −9.910 | 0.82 | 1.75211 | 25.05 |
| 8 | 79.086 | 5.03 | 1.72916 | 54.68 |
| 9 | −10.577 | 0.13 | | |
| 10 (Aspheric Surface) | 23.052 | 3.59 | 1.53071 | 55.67 |
| 11 (Aspheric Surface) | −61.341 | 17.15 | | |
| 12 | ∞ | 4.05 | 1.51633 | 64.14 |
| 13 | ∞ | 0.75 | | |
| Image Plane | ∞ | | | |

Aspheric Data
10th Surface

K = 1.173, A4 = 9.13316E−06, A6 = 9.23192E−08, A8 = 5.37667E−09

11th Surface

K = −30.572, A4 = 6.22828E−05, A6 = −1.61482E−08, A8 = 9.06148−09

Data Set

| | |
|---|---|
| f | 17.84 |
| Fno | 2.89 |
| Angle of View (2 ω) | 68.97° |
| Image Height | 11.15 |
| B F (in air) | 20.55 |
| Full Lens Length | 43.50 |

FIGS. 6 to 10 are aberration diagrams for the optical systems of Examples 1 to 5. Specifically, FIGS. 6(*a*) to 10(*a*) are aberration diagrams for the optical systems of Examples 1 to 5 upon focusing on infinity, and FIGS. 6(*b*) to 10(*b*) are aberration diagrams for the optical systems of Examples 1 to 5 upon close-range focusing (an object distance of 200 mm).

For spherical aberrations and chromatic aberration of magnification, numerals at the respective wavelengths of 486.1 nm (F-line: a one-dotted line), 587.6 nm (d-line: a solid line) and 656.3 nm (C-line: a broken line) are given. Astigmatism is shown with the sagittal image plane as a solid line and the meridional image plane as a dotted line. Note here that FNO is the F-number and ω is the half angle of view.

Tabulated below are the values of Conditions (1) to (14) in Examples 1 to 5.

| Condition | Example 1 | Example 2 | Example 3 |
|---|---|---|---|
| (1) | 1.53071 | 1.497 | 1.6935 |
| (2) | 1.11E−04 | −5.90E−06 | −5.30E−06 |
| (3) | 55.669 | 81.54 | 53.21 |
| (4) | 0.137 | 0.134 | 0.143 |
| (5) | 0.840 | 0.842 | 1.070 |
| (6) | 0.029 | 0.031 | 0.019 |
| (7) | 0.661 | 0.851 | 0.615 |
| (8) | 0.474 | 0.456 | 0.571 |
| (9) | 0.439 | 0.468 | 0.415 |
| (10) | 38.862 | 137.456 | 47.318 |
| (11) | 0.927 | 0.945 | 0.910 |
| (12) | 1.336 | 1.307 | 1.415 |
| (13) | 0.837 | 0.877 | 0.793 |
| (14) | 0.255 | 0.241 | 0.248 |

| Condition | Example 4 | Example 5 |
|---|---|---|
| (1) | 1.6935 | 1.53071 |
| (2) | −5.30E−06 | −5.90E−06 |
| (3) | 53.21 | 55.669 |
| (4) | 0.125 | 0.178 |
| (5) | 1.188 | 1.008 |
| (6) | 0.018 | 0.032 |
| (7) | 0.514 | 0.567 |
| (8) | 0.587 | 0.454 |
| (9) | 0.435 | 0.398 |
| (10) | 17.649 | 30.703 |
| (11) | 0.937 | 0.912 |
| (12) | 1.433 | 1.454 |
| (13) | 0.852 | 0.794 |
| (14) | 0.259 | 0.251 |

Figure 13:
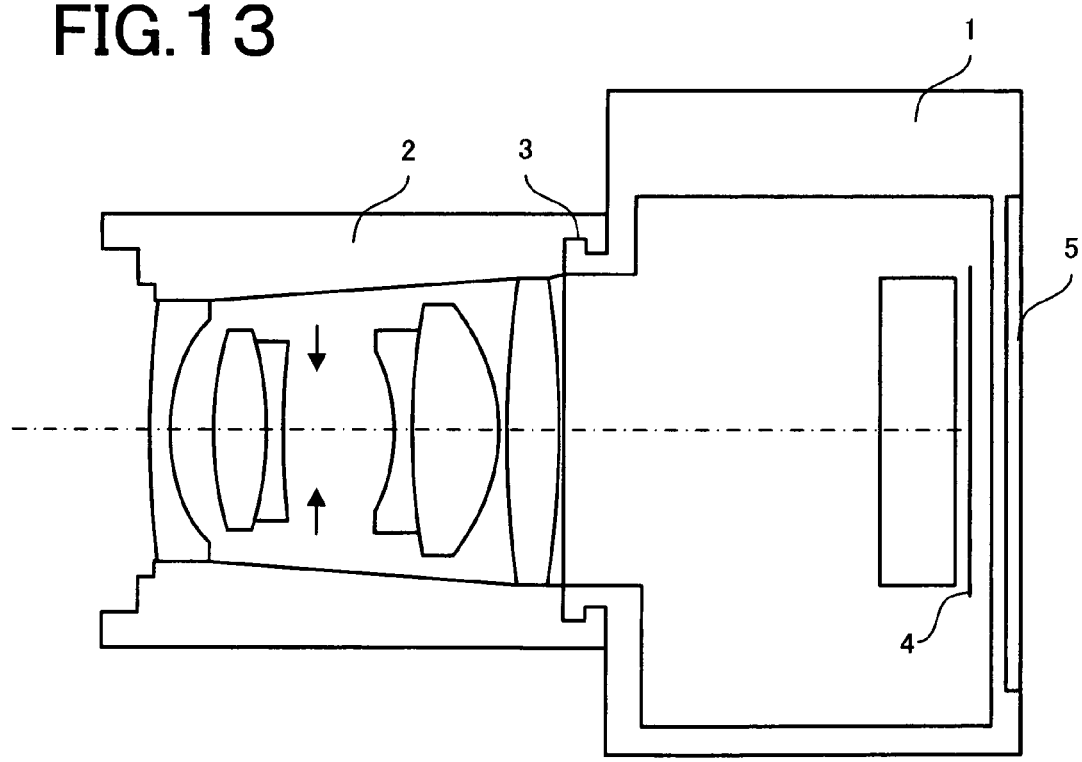
FIG. 13 is a sectional view of a lens interchangeable camera including the inventive wide-angle lens as an interchangeable lens.

FIG. 13 is a sectional view of a single-lens reflex camera that works as an electronic imaging apparatus that incorporates any one of the wide-angle lenses exemplified herein, and uses typically a small-format CCD or CMOS as the imaging device. In FIG. 13, reference numeral 1 is the single-lens reflex camera, 2 is an image-taking lens system received in a lens barrel, 3 is a lens mount for making the image-taking lens system 2 attachable to or detachable from the single-lens reflex camera 1, for which a screw type or bayonet type mount is used. The bayonet type lens mount is herein used. Reference numerals 4 and 5 are an imaging device plane and a back monitor, respectively.

The wide-angle lenses shown typically in Examples 1 to 5 are used for the image-taking lens 2 of the thus assembled single-lens reflex camera.

According to the inventive examples, it is possible to provide a low-lenses-count, compact wide-angle lens system that is used as an interchangeable lens well fit for a single-lens type digital camera, is well corrected just only for various aberrations in general and chromatic aberrations and field curvature in particular but also for distortion to some extents, and makes sure the telecentric feature.

Figure 14:
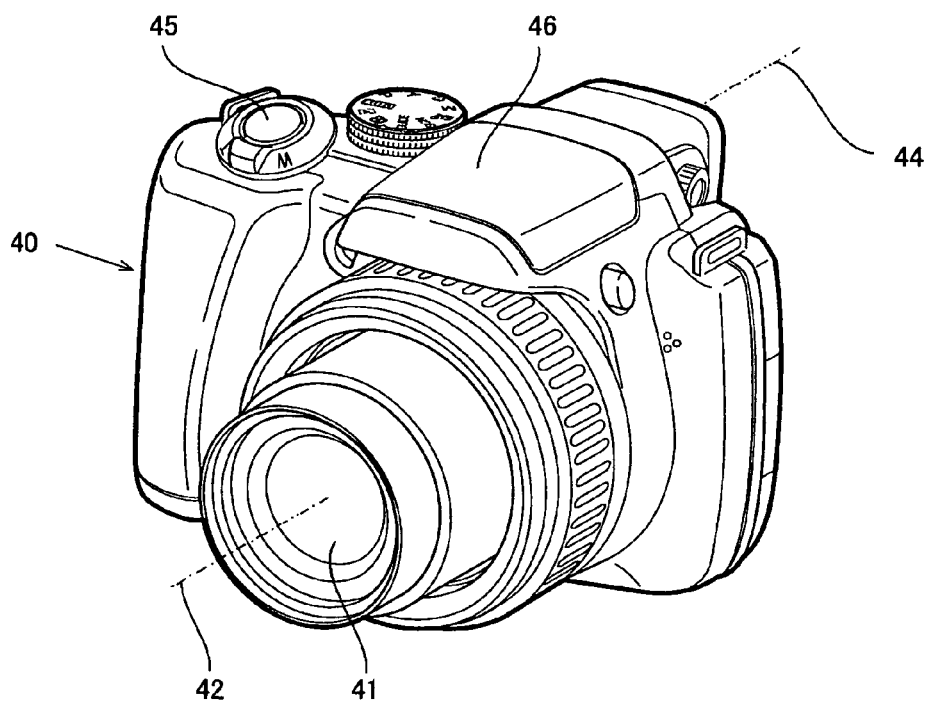
FIG. 14 is a front perspective view of the outside configuration of the inventive digital camera.
Figure 15:
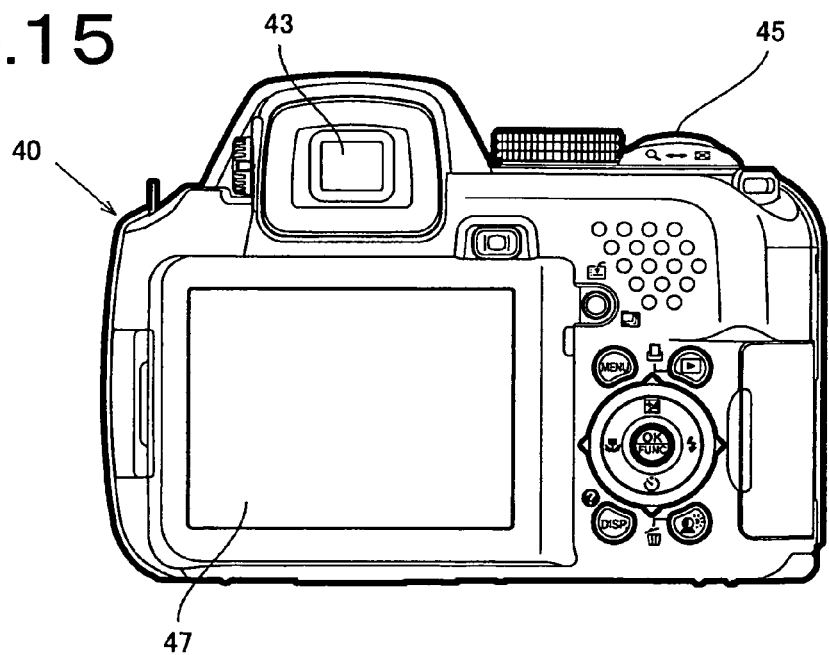
FIG. 15 is a rear view of the digital camera shown in FIG. 14.
Figure 16:
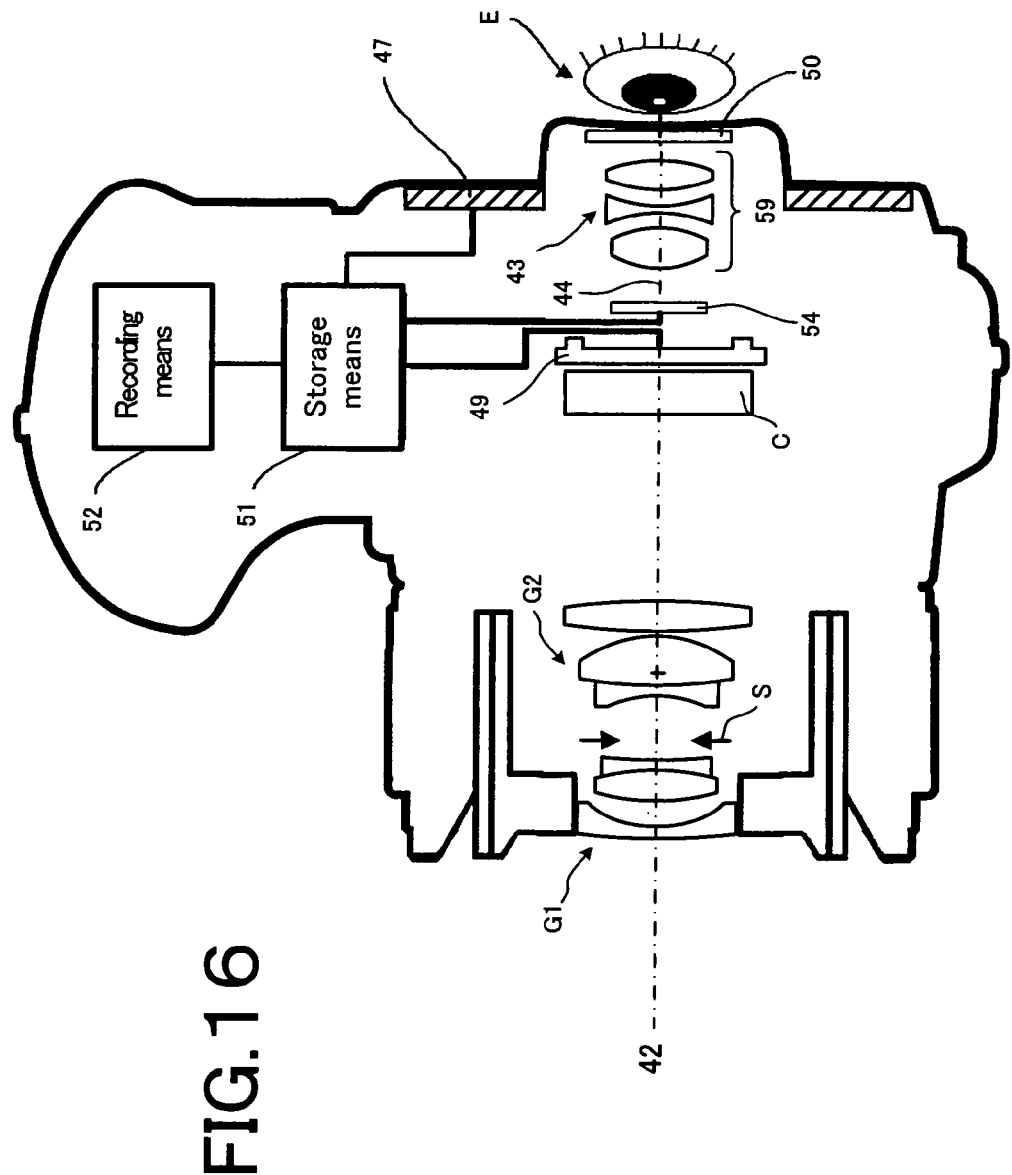
FIG. 16 is a cross-sectional view of the digital camera shown in FIG. 14.

FIGS. 14 to 17 are illustrative in conception of the arrangement of the inventive imaging apparatus having a wide-angle lens built in an image-taking optical system 41. Specifically, FIG. 14 is a front perspective view of the outside configuration of a digital camera 40, FIG. 15 is a rear view of the same, and FIG. 16 is a schematic cross-sectional view of the arrangement of the digital camera 40. It is here noted that FIG. 14 shows the image-taking optical system 41 in operation (not received in the lens mount), and FIG. 16 shows the image-taking optical system 41 not in operation (received in the lens mount).

The digital camera 40 here includes an image-taking optical system 41 positioned on an image-taking optical path 42, a finder optical system 43 positioned on a finder optical path 44, a shutter button 45, a popup strobe 46, a liquid crystal monitor 47, etc. As the shutter button 45 located on top of the camera 40 is pressed down, it causes images to be taken through the image-taking optical system 41, for instance, the lens of Example 1. An object image formed by the image-taking optical system 41 is then formed on the imaging plane (photoelectric transformation plane) of an imaging device CCD 49 located near the imaging plane via a cover glass C or the like. The object image received at that CCD 49 is displayed as an electronic image on the liquid crystal display monitor 47 on the back side of the camera or a finder image display device 54 via a processing means 51. The processing means 51 is connected with a recording means 52 for recording taken images in it.

In the not-in-operation state after the completion of image shooting, the whole image-taking optical system 41 remains stopped on the CCD 49 side with respect to the focusing-on-an-object-at-infinity position. It is here noted that the given space has been vacated between the image-taking optical system 41 and the second lens group G2 and the given space has been vacated between the most-image-side lens and the CCD 49 such that in the not-in-operation state, the whole image-taking optical system 41 moves along the optical axis to the CCD 49 side with respect to the focusing-on-an-object-at-infinity position. This thus makes sure the control zone on the CCD 49 side even with the whole lens barrel received in the lens mount.

It is here noted that the recording means 52 may be provided separately of the processing means 51 or, alternatively, images may be electronically written and recorded in flexible disks, memory cards, MOs or the like. If silver halide film is loaded in place of CCD 49, there may then be a silver halide film camera set up.

In addition, there is a finder eyepiece lens 59 located on the finder optical path 44. An object image displayed on the finder image display device 54 is enlarged and adjusted to an easy-to-look diopter by that finder eyepiece lens 59 before it is guided to the viewer's eyeball E. Note here that there is a cover member 50 located on the exit side of the finder eyepiece lens 59.

Figure 17:
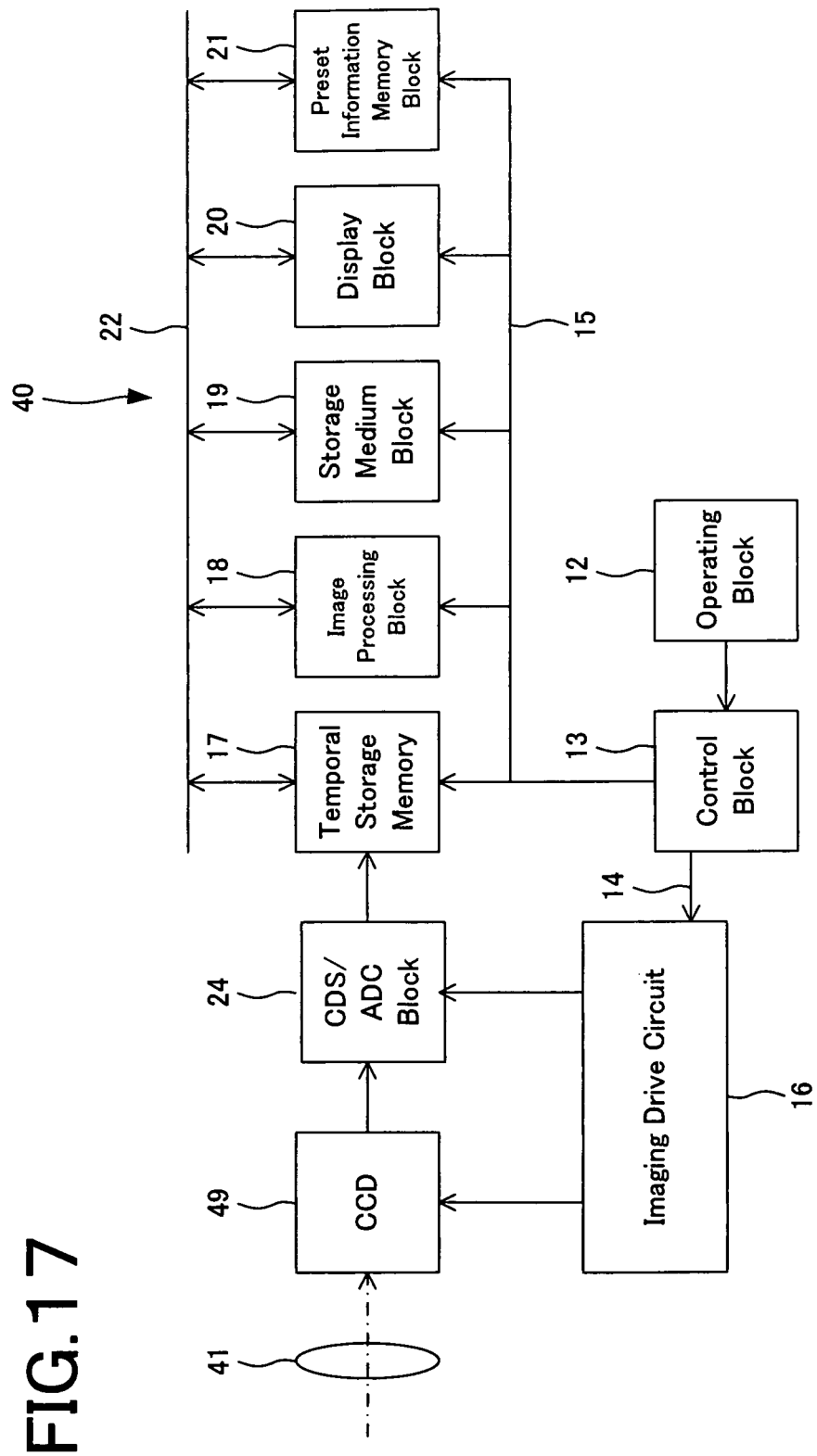
FIG. 17 is a block diagram for the internal circuitry of a main part of the digital camera shown in FIG. 14.

FIG. 17 is a block diagram for the makeup of the internal circuitry in a main part of the digital camera 40. As described just below, the processing means 51 typically includes a CDS/ADC block 24, a temporary storage memory 17, an image processing block 18, etc., and the recording means 52 includes a storage medium block 19, etc.

As shown in FIG. 17, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 receives an object image formed through the inventive image-taking optical system 41. More specifically, the CCD 49 is an imaging device that is driven and controlled by the taking drive circuit 16, and converts light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing including distortion correction based on an image quality parameter instructed by the control block 13.

The storage medium block 19 is a control circuit for a device that detachably receives a card type or stick type recording medium comprising typically a flash memory so that the RAW data transferred from the temporal memory 17 or image data processed at the image processing block 18 are recorded and held in that card type or stick type flash memory.

The display block 20 is a circuit that includes the liquid crystal display monitor 47 and finder image display device 54 to display images, operating menus or the like on them. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12. The preset information storage memory block 21 is a circuit for controlling inputs to or outputs out of those memories.

The thus assembled digital camera 40 can be provided as a low-lenses-count, compact wide-angle optical system that is just only well corrected for various aberrations in general and chromatic aberrations and field curvature in particular, with reduced field curvature fluctuations even upon focusing on close-range objects, but is also corrected for distortion to some extents, and makes sure the telecentric feature.

The inventive examples may be applied just only to the so-called single-lens reflex cameras and compact digital cameras designed to take images of general subjects but also to surveillance cameras that must have wide angles of view. A filter may be located on the object side of the first lens group G1.

What is claimed is:

1. A wide-angle optical system, comprising, in order from an object side thereof, a first lens group having negative refracting power and a second lens group having positive refracting power, wherein:
   the second lens group consists, in order from the object side,
   a first cemented doublet lens,
   an aperture stop,
   a second cemented doublet lens, and
   a first double-convex lens;
   a widest separation among axial air separation except a back focus provides an axial space for receiving the aperture stop;
   the optical system is divided into the first lens group and the second lens group with a second widest air separation as a boundary;
   the first lens group comprises a meniscus lens having an object-side surface convex to the object side, and a paraxial radius of curvature of the object-side surface is a positive value; and
   focusing is implemented by moving the whole optical system, with satisfaction of the following Condition (1):

$$1.45 \leq n_d \leq 1.75 \tag{1}$$

where $n_d$ is a d-line refractive index of the first double-convex lens.

2. The wide-angle optical system according to claim 1, wherein:
   the first cemented doublet lens consists of, in order from the object side, a lens whose cementing surface is convex and a lens whose cementing surface is concave, and
   the second cemented doublet lens consists of, in order from the object side, a lens whose cementing surface is concave and a lens whose cementing surface is convex.

3. The wide-angle optical system according to claim 1, wherein:

the first lens group consists of the meniscus lens that has negative refracting power, the first cemented doublet lens has positive refracting power, and consists of, in order from the object side, a second double-convex lens and a lens whose cementing surface is concave, and the second cemented doublet lens consists of, in order from the object side, a double-concave lens and a third double-convex lens.

4. The wide-angle optical system according to claim 1, wherein the second cemented doublet lens has positive refracting power.

5. A wide-angle optical system, comprising, in order from an object side thereof, a first lens group having negative refracting power and a second lens group having positive refracting power, wherein:

the second lens croup consists of, in order from the object side, a first cemented doublet lens, an aperture stop, a second cemented doublet lens, and a first double-convex lens;

a widest separation among axial air separation except a back focus provides an axial space for receiving the aperture stop;

the optical system is divided into the first lens croup and the second lens group with a second widest air separation as a boundary;

an image-side surface of the first double-convex lens is an aspheric surface having positive refracting power that becomes weak with a distance from an optical axis; and focusing is implemented by moving the whole optical system, with satisfaction of the following Condition (1):

$$1.45 \leq n_d \leq 1.75 \quad (1)$$

where $n_d$ is a d-line refractive index of the first double-convex lens.

6. The wide-angle optical system according to claim 1, wherein the first double-convex lens satisfies the following Condition (2):

$$|dn/dT| \leq 2.0E-4 \quad (2)$$

where dn/dT is a temperature coefficient [°C.$^{-1}$] of a d-line refractive index of the first double-convex lens.

7. The wide-angle optical system according to claim 1, wherein the first double-convex lens satisfies the following Condition (3):

$$40 \leq v_d \leq 95 \quad (3)$$

where $v_d$ is an Abbe constant on a d-line basis of the first double-convex lens defined by the following formula:

$$(n_d-1)/(n_F-n_c)$$

where $n_d$, $n_F$ and $n_c$ are d-line, F-line and C-line refractive indices of the first double-convex lens, respectively.

8. The wide-angle optical system according to claim 1, wherein the first double-convex lens satisfies the following Condition (4):

$$0.1 \leq PS \times f \leq 0.2 \quad (4)$$

where f is a focal length of the whole optical system, and PS is a Petzval's sum represented by the following formula:

$$PS = \Sigma ps_j = \Sigma [-c_j(1/n_j - 1/n_{j-1})]$$

where $ps_j$ is defined for each surface,
$c_j$ is a curvature,
$n_j$ is a d-line refractive index of an exit-side medium, and
$n_{j-1}$ is a d-line refractive index of an entrance-side medium.

9. The wide-angle optical system according to claim 1, wherein the first double-convex lens satisfies the following Conditions (5) and (6):

$$0.6 \leq hc12/he12 \leq 1.5 \quad (5)$$

$$0.01 \leq \Delta e/he12 \leq 0.05 \quad (6)$$

where hc12 is a distance from an optical axis to a point at which an off-axis chief ray having a half angle of view of incidence of 35° upon focusing on an object at infinity passes through an image-side surface of the first double-convex lens, he12 is a distance from the optical axis to a point taking an extreme value at the image-side surface of the first double-convex lens, and $\Delta e$ is a sum at the height he12 of a difference between the image-side surface of the first double-convex lens and a paraxial spherical surface and a difference between an object-side surface of the first double-convex lens and the paraxial spherical surface provided that (difference)=(actual surface shape)−(paraxial spherical shape) where a direction from an object toward the image plane is taken as positive.

10. An imaging apparatus, comprising:

the wide-angle optical system according to claim 1,
a driving means for moving the whole wide-angle optical system in an optical axis direction, and
an imaging device located near an imaging plane of the wide-angle optical system, wherein:

the wide-angle optical system is movable along an optical axis to an imaging device side with respect to a focusing-on-an-object-at-infinity position, and in a not-in-operation state, the wide-angle optical system remains stopped on the imaging device side with respect to the focusing-on-an-object-at-infinity position.

11. A wide-angle optical system, comprising, in order from an object side to an image side thereof, a first lens group having negative refracting power and a second lens group having positive refracting power, wherein:

the second lens group consists, in order from the object side, a first cemented doublet lens, an aperture stop, a second cemented doublet lens, and
a first double-convex lens;

a widest separation among axial air separation except a back focus provides an axial space for receiving the aperture stop;

the second cemented doublet lens consists of, in order from the object side, a first double-concave lens whose cementing surface is concave to the image side and a second double-convex lens whose cementing surface is convex to the object side;

the optical system is divided into the first lens group and the second lens group with a second widest air separation as a boundary; and focusing is implemented by moving the whole optical system, with satisfaction of the following Condition (1):

$$1.45 \leq n_d 1.75 \quad (1)$$

where $n_d$ is a d-line refractive index of the first double-convex lens.

12. The wide-angle optical system according to claim 11, wherein: the first cemented doublet lens consists of, in order from the object side, a lens whose cementing surface is convex to the image side and a lens whose cementing surface is concave to the object side.

13. The wide-angle optical system according to claim 11, wherein:

the first lens group consists of a meniscus lens that is convex on its object side and has negative refracting power, the first cemented doublet lens has positive refracting power, and consists of, in order from its object side, a third double-convex lens and a lens whose cementing surface is concave.

* * * * *